US012675359B2

(12) United States Patent
Dokumaci et al.

(10) Patent No.: US 12,675,359 B2
(45) Date of Patent: Jul. 7, 2026

(54) SYSTEMS AND METHODS FOR AUTOMATED ANOMALY DETECTION

(71) Applicant: Optum, Inc., Minnetonka, MN (US)

(72) Inventors: Ahmet K. Dokumaci, Burnsville, MN (US); Praveen S. Shettigar, Austin, TX (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/818,864

(22) Filed: Aug. 29, 2024

(65) Prior Publication Data

US 2026/0064514 A1 Mar. 5, 2026

(51) Int. Cl.
*G06F 11/07* (2006.01)

(52) U.S. Cl.
CPC .......... *G06F 11/079* (2013.01); *G06F 11/076* (2013.01)

(58) Field of Classification Search
CPC .............................. G06F 11/076; G06F 11/079
See application file for complete search history.

(56) References Cited

U.S. PATENT DOCUMENTS

| | | | | |
|---|---|---|---|---|
| 10,637,745 | B2 | 4/2020 | Naous | |
| 11,061,393 | B2 | 7/2021 | Abe et al. | |
| 11,392,446 | B2 * | 7/2022 | Poole ....................... | C22C 38/50 |
| 11,876,825 | B1 * | 1/2024 | Shama ................ | H04L 63/1433 |
| 12,265,446 | B1 * | 4/2025 | Callot ................. | G06F 11/0793 |
| 2022/0188424 | A1 * | 6/2022 | Chan .................... | G06F 16/9024 |
| 2024/0333739 | A1 * | 10/2024 | Agrawal ............. | H04L 63/1425 |

OTHER PUBLICATIONS

Box et al., "Time Series Analysis: Forecasting and Control," San Francisco: Holden-Day, published in 1970, retrieved from https://archive.org/details/timeseriesanalys0000boxg (1 page).
Dijkstra, "A Note on Two Problems in Connexion with Graphs," Numerische Mathematik, published in 1959, retrieved from https://ir.cwi.nl/pub/9256/9256D.pdf (3 pages).
ExtraHop, "Reveal(x) 360," published date unknown but published before May 6, 2024, retrieved from https://hop.extrahop.com/products/cloud/ (8 pages).

(Continued)

*Primary Examiner* — Jigar P Patel
(74) *Attorney, Agent, or Firm* — Bookoff McAndrews, PLLC

(57) ABSTRACT

Systems and computer-implemented methods are disclosed for detecting a system anomaly. A computer-implemented method comprises: receiving, by a data storage module, time-series data from a plurality of sensors of an information technology infrastructure, each sensor corresponding to a respective metric; detecting a plurality of anomalies in the time-series data stored in the data storage module; generating a knowledge graph by: determining connections between the plurality of metrics based on the time-series data; and for each connection, determining a respective weight based on an impact score for metrics joined by the connection; and configuring a root cause determination engine to output one or more metrics as root cause candidates, the one or more metrics based on the knowledge graph, in response to input of a query associated with at least one metric.

20 Claims, 4 Drawing Sheets

(56) References Cited

OTHER PUBLICATIONS

Grotov, "Automated Root Cause Analysis & Anomaly Detection in Concert," StackState, published on Jul. 28, 2020, retrieved from https://www.stackstate.com/blog/automated-root-cause-analysis-and-anomaly-detection-in-concert/ (2 pages).

Lloyd, "Least Squares Quantization in PCM," IEEE Transactions on Information Theory, published in Mar. 1982, retrieved from http://ayesha.lti.cs.cmu.edu/mlsp/courses/fall2010/class14/lloyd.pdf (9 pages).

Qiu et al., "A Causality Mining and Knowledge Graph Based Method of Root Cause Diagnosis for Performance Anomaly in Cloud Applications," MDPI, published on Mar. 22, 2020, retrieved from https://www.mdpi.com/2076-3417/10/6/2166 (19 pages).

* cited by examiner

400

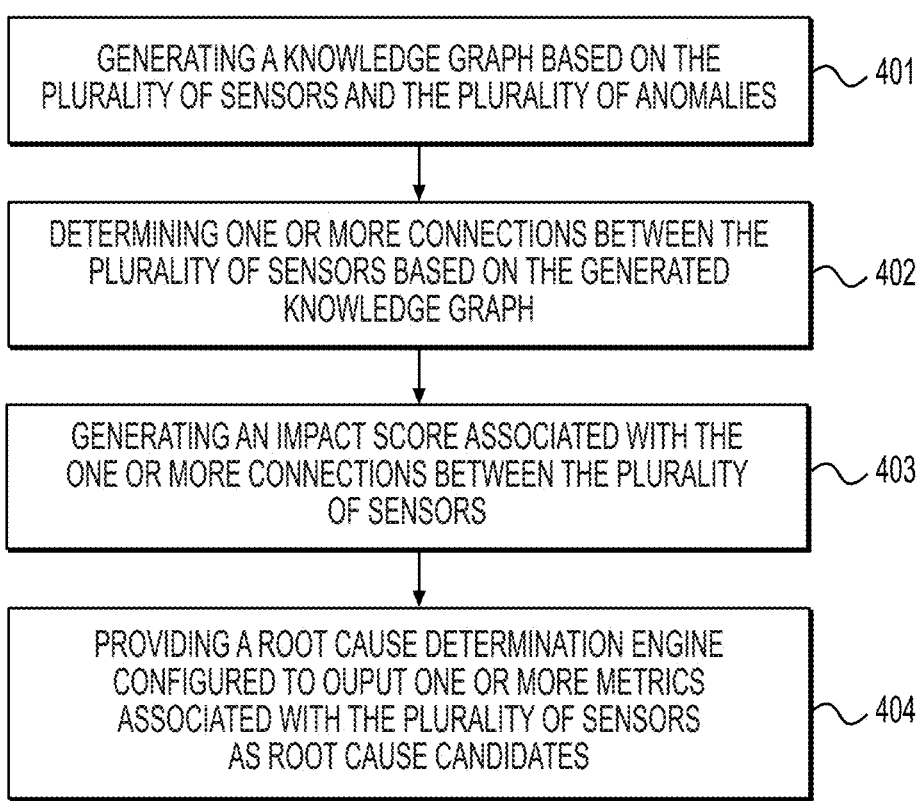

GENERATING A KNOWLEDGE GRAPH BASED ON THE
PLURALITY OF SENSORS AND THE PLURALITY OF ANOMALIES ⟋ 401

DETERMINING ONE OR MORE CONNECTIONS BETWEEN THE
PLURALITY OF SENSORS BASED ON THE GENERATED
KNOWLEDGE GRAPH ⟋ 402

GENERATING AN IMPACT SCORE ASSOCIATED WITH THE
ONE OR MORE CONNECTIONS BETWEEN THE PLURALITY
OF SENSORS ⟋ 403

PROVIDING A ROOT CAUSE DETERMINATION ENGINE
CONFIGURED TO OUPUT ONE OR MORE METRICS
ASSOCIATED WITH THE PLURALITY OF SENSORS
AS ROOT CAUSE CANDIDATES ⟋ 404

OUTPUTTING A REPORT OF THE ROOT CAUSE
CANDIDATES TO A DOWNSTREAM ENTITY ⟋ 501

FIG. 4

SYSTEMS AND METHODS FOR AUTOMATED ANOMALY DETECTION

TECHNICAL FIELD

The present disclosure generally relates to the field of data analytics and automated anomaly detection. More particularly, the present disclosure relates to systems and methods for detection and reporting of anomalies in technology infrastructure stacks.

BACKGROUND

A technology stack that makes up a solution is often a combination of several technologies or components that includes hardware and software. In modern-day information technology infrastructure, the elements that make up a technology stack are generally interdependent, whereby each component serves a piece of the solution. Degradation and/or failure of these systems or services is common, and thus proactive monitoring is often used to mitigate or address such issues.

However, conventional monitoring solutions may not able to understand the complex interrelationships between elements, and thus may not be equipped to extract meaningful information from observations. Moreover, conventional monitoring solutions often rely on manually driven metrics or alerts, which are often subjective and/or require deep institutional knowledge to implement and/or evaluate. Further, technology stacks may differ broadly across different institutions, meaning that conventional solutions generally either require significant tuning on a case-by-case basis, or are bespoke solutions that are not generally applicable.

This disclosure is directed to addressing one or more challenges such as the above. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for anomaly detection.

In one embodiment, a computer-implemented method for anomaly detection comprises: receiving, by a data storage module, time-series data from a plurality of sensors of an information technology infrastructure, each sensor corresponding to a respective metric; detecting a plurality of anomalies in the time-series data stored in the data storage module; generating a knowledge graph by: determining connections between the plurality of metrics based on the time-series data; and for each connection, determining a respective weight based on an impact score for metrics joined by the connection; and configuring a root cause determination engine to output one or more metrics as root cause candidates, the one or more metrics based on the knowledge graph, in response to input of a query associated with at least one metric.

In another embodiment, a system comprises: a plurality of sensors associated with an information technology infrastructure, each sensor corresponding to a respective metric; one or more processors operatively connected to the plurality of sensors; and at least one non-transitory computer readable medium storing instructions that are executable by the one or more processors to perform operations comprising: receiving, by a data storage module, time-series data from the plurality of sensors; detecting a plurality of anomalies in the time-series data stored in the data storage module; generating a knowledge graph by: determining connections between the plurality of metrics based on the time-series data; and for each connection, determining a respective weight based on an impact score for metrics joined by the connection; and configuring a root cause determination engine to output one or more metrics as root cause candidates in response to input of a query associated with at least one metric based on the knowledge graph.

In yet another embodiment, a non-transitory computer readable medium stores instructions which, when executed by one or more processors, cause the one or more processors to perform operations comprising: receiving, by a data storage module, time-series data from a plurality of sensors of an information technology infrastructure, each sensor corresponding to a respective metric; detecting a plurality of anomalies in the time-series data stored in the data storage module; generating a knowledge graph by: determining connections between the plurality of metrics based on the time-series data; and for each connection, determining a respective weight based on an impact score for metrics joined by the connection; and providing a root cause determination engine configured to output one or more metrics as root cause candidates in response to input of a query associated with at least one metric based on the knowledge graph.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 depicts a flowchart for generating one or more knowledge graphs using a root cause determination engine, according to one or more embodiments.

FIG. 4 depicts a flowchart for outputting a report, according to one or more embodiments.

DETAILED DESCRIPTION OF EMBODIMENTS

Figure 1:
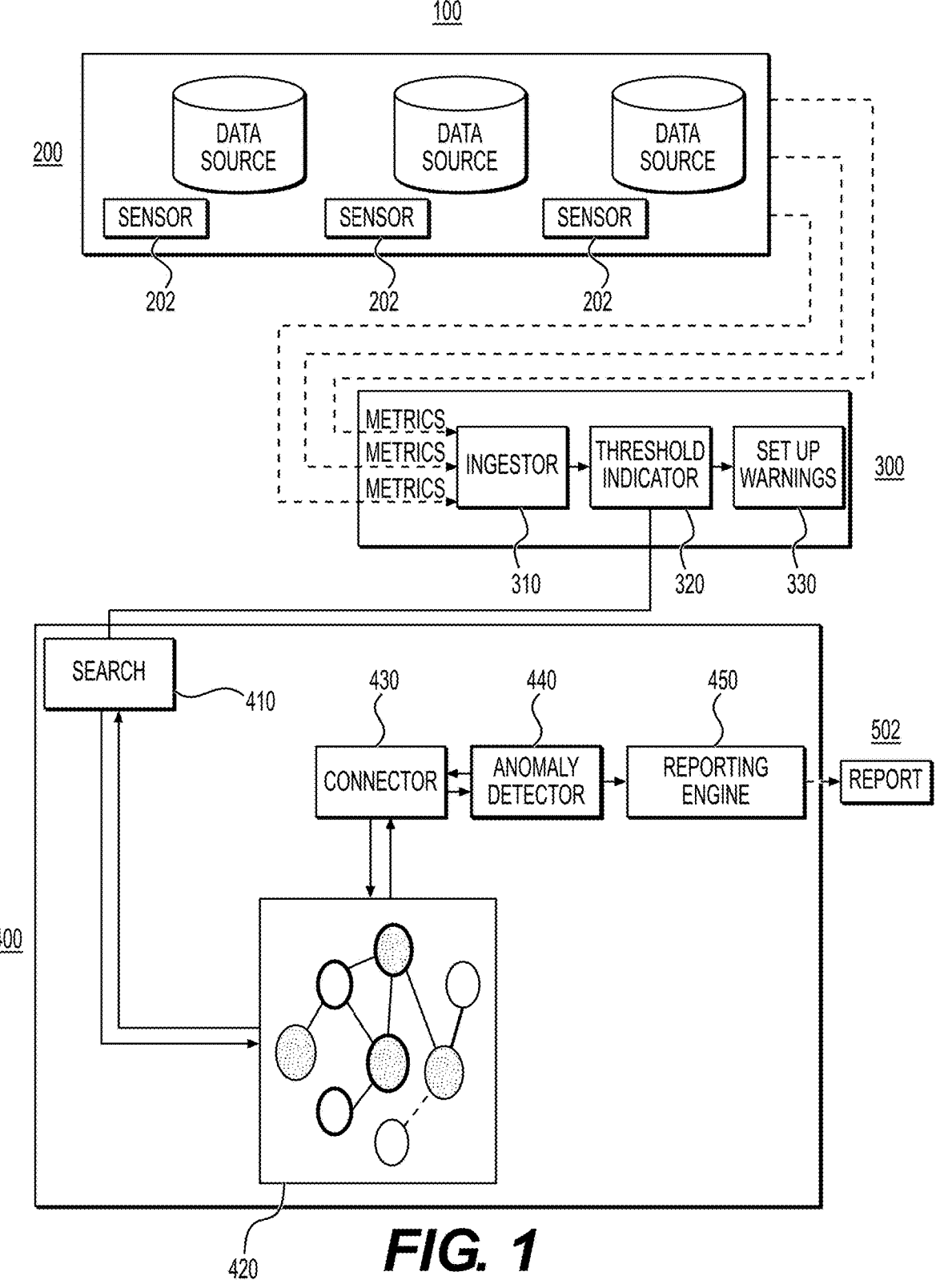
FIG. 1 depicts an exemplary technology system infrastructure for smart monitoring, according to one or more embodiments.

The present disclosure generally relates to the field of data analytics and automated anomaly detection. More particularly, the present disclosure relates to systems and methods for detection of anomalies in time-series data and attribution of likely root causes using knowledge graphs.

As discussed above, monitoring is widely applied to technology stacks in order to identify and address the degradation and/or failures that commonly arise in such system. While individual elements in a stack may be independently monitored, the varied interdependency of elements in a stack commonly results in an anomalous state in one element being caused by, associated with, or otherwise correlated with another element or elements. Such scenarios may be difficult to monitor or even understand, e.g., without institutional knowledge or an understanding of how various elements in the stack are related. For example, determining a root cause for a CPU spike would conventionally include having an engineer log into the system and begin a manual investigation to trace down a source of the spike, e.g., an increase in activity in another dependent application. In other words, conventional monitoring solutions may not provide information on the root cause for an alert.

Another problem with conventional solutions relates to monitoring massive amounts of metrics data. Applications regularly generate massive amounts of metric and log data, and a technology stack may include any number of applications. These metrics may be generated, for example, by servers, Java applications, managed cloud services, or any component that constitutes a software element and interacts with a software element as part of its process. Examples of metrics include CPU usage, memory usage, response time, error rate, request counts, etc. Each of these metrics may have a different impact on an application, and some metrics may require implementation of sophisticated calculations to provide meaningful information on its status.

Metric data is typically collected by a monitoring software and stored as time-series data. Time-series data is data that is indexed in time order. The volume of data generated by all the applications that may be present in a technology stack may pose a challenge from a data processing perspective.

In order to effectively monitor time-series metric data and proactively avoid any degradation of performance or availability of applications in a technology stack, the impact of the monitored metrics is measured, and rules are set up to evaluate the status of these metrics. However, the magnitude and variety of the data may make it very difficult and/or complex to understand how different metrics impact different applications.

Another challenge is to set thresholds or expected values for these metrics. For example, CPU usage would be at a critical level for an application if it's above 85%, but for error rates it might be critical when it is about 1%. However, there are metrics such as request counts that cannot be directly represented as a percentage, and calculating a value to monitor this metric may be more difficult because values of these metrics may not yield any meaningful result unless it is used relative to other metrics. The history of this metric and understanding of the patterns to determine whether this metrics is experiencing any anomalies is also important. Given the diversity and complexity of a micro-services architecture and all the metrics each application component emits, there is a challenge in identifying critical values and anomalies for all these metrics. As a result, conventional solutions generally rely on institutional knowledge and expertise, rather than an objective determinative measure.

In other words, existing monitoring solutions are generally not able to understand the data they are used to monitoring, and are generally not equipped to extract meaningful information from it. Even though they process and collect time-series data, it's up to an operator to set up alerts and understand this data. Every stack within an organization brings some level of uniqueness.

Embodiments of the present disclosure are directed to a system and method for enabling smart monitoring of a technology infrastructure stack in an efficient manner, reducing costs for parties, and minimizing downtime of applications within the technology infrastructure stack, e.g., by evaluating time-series data to generate knowledge graphs, and/or using impact scores and knowledge graphs to identify root cause candidates. A user performing manual root cause analysis tends to take action based on a user-biased assumption on what affects the performance of an entity, such as a business transaction.

Embodiments of the present disclosure provide an improved method of determining root analysis of a technology infrastructure stack by automatically determining where in the technology infrastructure stack an entity has been affected. In such an embodiment, the present disclosure provides for a faster response time to the identified affected entity. Moreover, the present disclosure provides for an objective quantification of relationships between applications and devices that conventionally relied on subjective institutional knowledge. Further, the relationships and conclusions generated via the techniques disclosed herein result from the processing of a quantity and quality of data not possible to parse via the human mind.

FIG. 1 depicts an exemplary technology system infrastructure 100 for smart monitoring, in accordance with one or more embodiments of this disclosure. As shown in FIG. 1, the technology system infrastructure 100 includes a data source 200, a training module 300, and a root cause determination engine 400.

The data source 200 is configured to generate time-series data. The data source 200 includes one or more sensors 202. The one or more sensors 202 generate the time-series data of the data source 200 by querying the data source 200 at regular intervals. In an example, sensors 202 are physical sensors coupled with the data source 200. In other examples, the sensors 202 are sensors generated by the data source 200. In some other examples, the sensors 202 are virtual sensors associated with the data source 200. As an example, the data source 200 is a server, an application (e.g., Azure Monitor®, Prometheus®, or PostgreSQL®), or the like. The time-series data may include, for example, CPU Percentage, response time, error count, latency, or any other measurable metric of a technology system infrastructure stack.

In an example, the training module 300 is configured to receive the time-series data from the data source 200 and develop relational identifications based on the time-series data. The training module includes an ingestor 310, a threshold indicator 320, and an alert generator 330. The ingestor 310 retrieves the time-series data from the data source 200 and store the time-series data in a data storage module. The time-series data may be retrieved periodically. For example, the time-series data may be retrieved hourly, daily, weekly, monthly, or any other desired timeline. In other examples, the time-series data may be continuously retrieved such that the time-series data is retrieved in real-time. The threshold indicator 320 determines a threshold for alerting a downstream entity of an anomaly based on the time-series data received in the data storage module. The alert generator 330 creates alerts based on the threshold indicator determining that a threshold has been breached.

In an example, the root cause determination engine 400 is configured to output one or more metrics as a root cause candidate based on the anomaly. For example, the root cause determination engine 400 generates relationship data indicative of a chain of relationships among different entities associated with the detected anomaly or performance issue. The root cause determination engine 400 includes a search engine 410, a relationship engine 420, a connector 430, an anomaly detector 440, and a reporting engine 450. The search engine 410 queries the data storage module for relevant metrics and/or applications associated with the time-series data. For example, the relevant metrics may be determined from keywords, metric names, applications, or any received request from a user of the technology system infrastructure 100. The relationship engine 420 generates one or more knowledge graphs between the relevant metrics associated with the time-series data. The connector 430 connects the one or more knowledge graphs based on historical anomaly data, correlations between the one or more knowledge graphs, and frequent item-set mining. The anomaly detector 440 determines points of anomaly within the technology system infrastructure 100 associated with the time-series data. The reporting engine 450 generates a report 502 based on the one or more knowledge graphs. The report 502 includes the relevant metrics output as a root cause candidate, e.g., to facilitate identification of the root cause of the detected performance issue.

Figure 2:
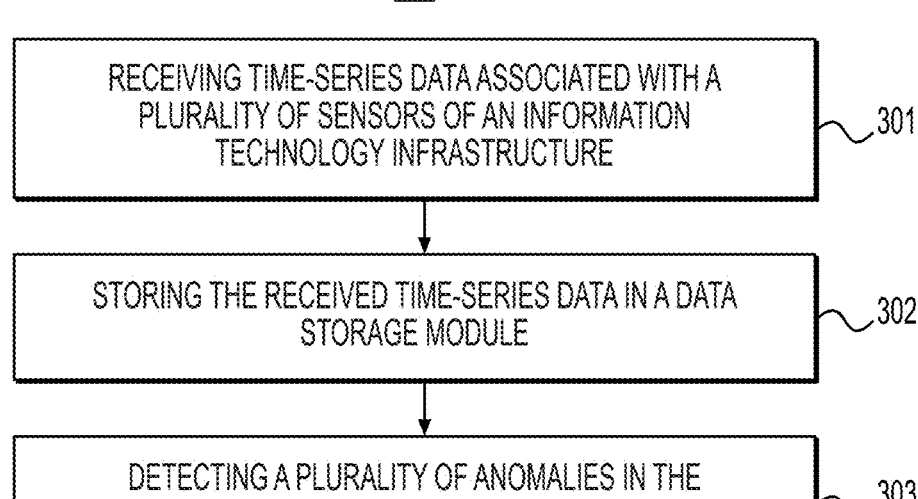
FIG. 2 depicts a flowchart of a method for a training module for identifying anomalies within time-series data, according to one or more embodiments.

FIG. 2 is a process flowchart for an example training module 300 for identifying anomalies within time-series data. At step 301, the data storage module receives time-series data associated with the plurality of sensors 202 of the technology system infrastructure 100. At step 302, the time-series data is stored in the data storage module. At step 303, a plurality of anomalies is detected in the time-series data. The plurality of anomalies may be detected using any suitable technique, e.g., a K-Nearest Neighbors Detector Algorithm. Each anomaly of the plurality of anomalies is given an anomaly score. In this embodiment, the anomaly score is a value between 1 and 0, but any suitable scoring technique may be used in other embodiments. A value of 1 indicating a higher certainty of anomaly and a value of 0 indicating a lower certainty of anomaly.

FIG. 3 is a process flowchart for generating one or more knowledge graphs using the root cause determination engine 400. At step 401, the one or more knowledge graphs are generated using one or more of a graph data structure, nodes, or weighted directed edges. The one or more knowledge graphs are based on the time-series data and/or anomaly score calculated for each plurality of anomalies. Respective applications of the technology system infrastructure 100 and metrics associated with the plurality of sensors represent the nodes of the one or more knowledge graphs. At step 402, one or more connections are generated between the one or more knowledge graphs.

At step 403, an impact score is generated based on the one or more connections between the knowledge graphs. The impact score represents the magnitude of impact of metric(s) or application(s) in case of a performance degradation in a service or an occurrence of an anomaly. The impact score is a value between 1 and 0. The value 1 representing the highest impact and the value zero indicating no impact. The impact score is generated using the anomaly score, a correlation score, and a support value.

Metric data associated with the time-series data is evaluated for anomalies separately. Determining the correlation score includes assigning a value between 0 and 1 to each timestamp associated with the time-series data and metric value pair, representing the correlation score. The data is grouped based on the identified correlation. The correlated data is then evaluated for frequent item-sets. The correlated metric data is grouped by a correlation such as applications, metrics, or the like.

In some examples, the correlated data is also processed by the anomaly detection process. In such an example, each metric and timestamp pair are assigned a secondary anomaly score that is separate from the first assigned anomaly score. In some examples, the secondary anomaly score is the same value as the first assigned anomaly score. In some other examples, the secondary anomaly is different from the first assigned anomaly score.

The process then runs a correlation calculation and finds the correlation values between individual metric secondary anomaly scores and combined metric data's secondary anomaly scores. For example, a correlation calculation finds the correlation of values between individual metric secondary anomaly scores and combined metric data's secondary anomaly score to store in the storage database. The frequent item-set mining algorithm is used on the correlation of values stored in the storage database. The correlation of values stored in the storage database yields pairs of data associated with metrics and anomalies, and support values are assigned to the pairs of data. A support value in a pair shows the usefulness of an item-set. In an example, only the top 5% of the pairs are selected and the rest are assigned to a value of 0. In another example, only the top 10% of the pairs are selected and the rest are assigned to a value of 0. In other examples, only the top 25% of the pairs are selected and the rest are assigned to a value of 0. Any given percentage of the pairs may be selected as necessary for determining the usefulness of a given item-set.

Thus, the impact score may be determined based on the anomaly score, a correlation score, and a support value. In an example, the impact score may be represented as a formula:

$$X = \frac{P + S + C}{3}$$

where: P=anomaly score [0,1], S=support value [0,1], C=correlation score [0,1], and X=impact score.

In an example, a similar, but different, calculation of the impact score may be determined only against correlated applications, rather than both metrics and applications. The data is formatted to include only timestamps and anomaly scores. Correlation scores may be calculated between the application anomaly scores. A support score may be calculated between the respective applications in a similar manner, and a top portion, e.g., 5%, of the pairs may be selected. This impact score may be represented as a formula:

$$X = \frac{S + C}{2}$$

where: S=support value [0,1], C=correlation score [0,1], and X=impact score.

The impact score is used to determine the weights of directed edges between respective nodes in the one or more knowledge graphs. These nodes may represent applications, metrics, and impacts as directed edges between applications and/or metrics associated with the anomaly score.

In some embodiments, the one or more knowledge graphs are searched, e.g., in response to a query from a user and/or automated alert, to determine relationships between elements within the one or more knowledge graphs. The metrics and applications relevant to an input application and metric are compared to generate said relationships. In an example, the one or more knowledge graphs are searched using a shortest path algorithm. The shortest path algorithm, in an example, includes a Bellman Ford Algorithm or any other algorithm that finds shortest paths between nodes in a weighted directed graph.

At step 404, the generated knowledge graph(s) are used to form the basis for the root cause determination engine 400 associated with the one or more metrics as one or more root cause candidates. The root cause determination engine 400 is configured to output one or more metrics as one or more root cause candidates to an input alert or metric. In some examples, the technology system infrastructure 100 runs the aforementioned processes periodically to update the graph data with newly received time-series data. In some other examples, the technology system infrastructure 100 runs the aforementioned processes continuously to update the graph data with newly received time-series data.

FIG. 4 depicts a process flowchart 500 for outputting the report 502. In an example, the report 502 is generated automatically based on an alert threshold. The alert threshold, for example, is based on a number of the plurality of anomalies that have been breached. The alert threshold is based on the received time-series data. In some examples, the alert threshold being breached is based on a number of the plurality of anomalies triggers the root cause determination engine 400 to determine the root cause candidate of the triggering anomalies and generate the report 502. In other examples, a query is received by the root cause determination engine 400. The query is associated with a particular node of the technology infrastructure stack 100. The query is received from a third party (e.g., a user, a downstream entity, etc.) in regards to the particular node of the technology infrastructure stack 100.

In an example, the root cause determination engine 400 generates the report 502 based on the query. In some examples, the root cause determination engine 400 generates the report 502 based solely on the node associated with the query. In other examples, the root cause determination engine 400 generates the report 502 for all nodes, including the queried node, of the technology infrastructure stack 100. At step 501, the report 502 is transmitted to a downstream entity. The report 502 includes the one or more root cause candidates associated with the one or more metrics based on the knowledge graphs.

When an alert is generated, the system uses the metadata from the alert and searches for relevant applications and metrics using the previously generated knowledge graph data. This enables the display of the status of the most relevant metrics and applications together, leading to faster time to find a root cause of an anomaly in a technology system infrastructure 100.

Figure 5:
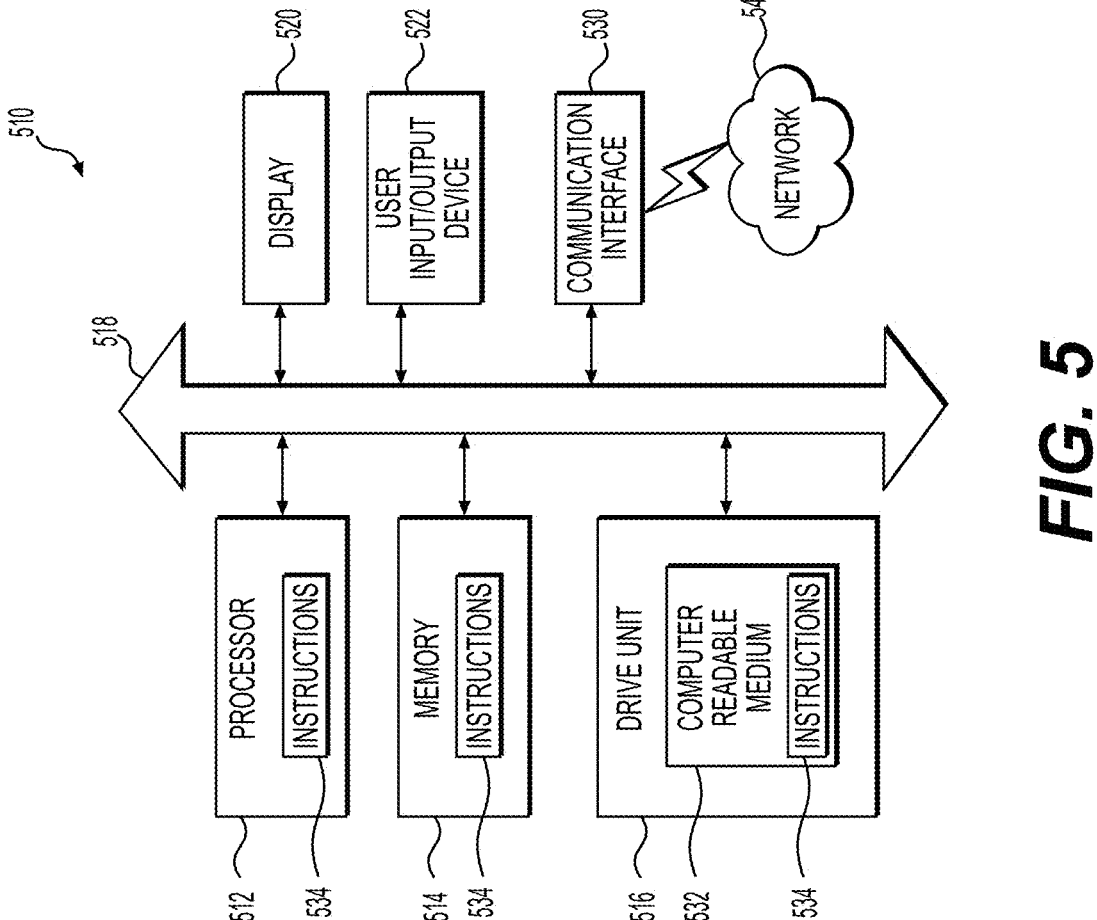
FIG. 5 shows an implementation of a computer system that executes techniques presented herein, according to some embodiments of the disclosure.

FIG. 5 shows an implementation of a computer system 510 that executes techniques presented herein, according to some embodiments of the disclosure. The computer system 510 can include a set of instructions that can be executed to cause the computer system 510 to perform any one or more of the methods or computer-based functions disclosed herein. The computer system 510 operates as a standalone device or is connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" refers to any device or portion of a device that processes electronic data, e.g., from registers and/or memory to transform that electronic data into other electronic data that, e.g., is stored in registers and/or memory. A "computer," a "computing machine," a "computing platform," a "computing device," or a "server" includes one or more processors.

In a networked deployment, the computer system 510 operates in the capacity of a server or as a client user computer in a server-client user network environment, or as a peer computer system in a peer-to-peer (or distributed) network environment. The computer system 510 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 510 can be implemented using electronic devices that provide voice, video, or data communication. Further, while the computer system 510 is illustrated as a single system, the term "system" shall also be taken to include any collection of systems or sub-systems that individually or jointly execute a set, or multiple sets, of instructions to perform one or more computer functions.

As illustrated in FIG. 5, the computer system 510 includes a processor 512, e.g., a central processing unit (CPU), a graphics processing unit (GPU), or both. The processor 512 can be a component in a variety of systems. For example, the processor 512 is part of a standard personal computer or a workstation. The processor 512 is one or more processors, digital signal processors, application specific integrated circuits, field programmable gate arrays, servers, networks, digital circuits, analog circuits, combinations thereof, or other now known or later developed devices for analyzing and processing data. The processor 512 implements a software program, such as code generated manually (e.g., programmed).

The computer system 510 includes a memory 514 that can communicate via a bus 518. The memory 514 is a main memory, a static memory, or a dynamic memory. The memory 514 includes, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, and the like. In one implementation, the memory 514 includes a cache or random-access memory for the processor 512. In alternative implementations, the memory 514 is separate from the processor 512, such as a cache memory of a processor, the system memory, or other memory. The memory 514 can be an external storage device or database for storing data. Examples include a hard drive, compact disc ("CD"), digital video disc ("DVD"), memory card, memory stick, floppy disc, universal serial bus ("USB") memory device, or any other device operative to store data. The memory 514 is operable to store instructions executable by the processor 512. The functions, acts or tasks illustrated in the figures or described herein are performed by the processor 512 executing the instructions stored in the memory 514. The functions, acts or tasks are independent of the particular type of instructions set, storage media, processor or processing strategy and are performed by software, hardware, integrated circuits, firm-ware, micro-code and the like, operating alone or in combination. Likewise, processing strategies can include multiprocessing, multitasking, parallel processing, and the like.

As shown, the computer system 510 further included a display 520, such as a liquid crystal display (LCD), an organic light emitting diode (OLED), a flat panel display, a solid-state display, a cathode ray tube (CRT), a projector, a printer or other now known or later developed display device for outputting determined information. The display 520 acts as an interface for the user to see the functioning of the processor 512, or specifically as an interface with the software stored in the memory 514 or in a drive unit 516.

Additionally or alternatively, the computer system 510 includes an input/output device 522 configured to allow a user to interact with any of the components of the computer system 510. The input/output device 522 is a number pad, a keyboard, or a cursor control device, such as a mouse, or a joystick, touch screen display, remote control, or any other device operative to interact with the computer system 510.

The computer system 510 also or alternatively includes the drive unit 516 implemented as a disk or optical drive. The drive unit 516 includes a computer-readable medium 532 in which one or more sets of instructions 534, e.g., software, can be embedded. Further, the sets of instructions 534 embody one or more of the methods or logic as described herein. The instructions 534 reside completely or partially within the memory 514 and/or within the processor 512 during execution by the computer system 510. The memory 514 and the processor 512 can also include computer-readable media as discussed above.

In some systems, the computer-readable medium 532 includes the sets of instructions 534 or receives and executes the sets of instructions 534 responsive to a propagated signal so that a device connected to a network 540 can communicate voice, video, audio, images, or any other data over the network 540. Further, the sets of instructions 534 are transmitted or received over the network 540 via a communication port or interface 530, and/or using the bus 518. The communication port or interface 530 is a part of the processor 512 or is a separate component. The communication port or interface 530 is created in software or is a physical connection in hardware. The communication port or interface 530 are configured to connect with the network 540, external media, the display 520, or any other components in the computer system 510, or combinations thereof. The connection with the network 540 is a physical connection, such as a wired Ethernet connection or is established wirelessly as discussed below. Likewise, the additional connections with other components of the computer system 510 are physical connections or are established wirelessly. The network 540 is alternatively directly connected to the bus 518.

While the computer-readable medium 532 is shown to be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding, or carrying a set of instructions for execution by a processor or that cause a computer system to perform any one or more of the methods or operations disclosed herein. In some examples, the computer-readable medium 532 is non-transitory, and is tangible.

The computer-readable medium 532 can include a solid-state memory such as a memory card or other package that houses one or more non-volatile read-only memories. The computer-readable medium 532 can be a random-access memory or other volatile re-writable memory. Additionally or alternatively, the computer-readable medium 532 can include a magneto-optical or optical medium, such as a disk or tapes or other storage device to capture carrier wave signals such as a signal communicated over a transmission medium. A digital file attachment to an e-mail or other self-contained information archive or set of archives are considered a distribution medium that is a tangible storage medium. Accordingly, the disclosure is considered to include any one or more of a computer-readable medium or a distribution medium and other equivalents and successor media, in which data or instructions are storable.

In an alternative implementation, dedicated hardware implementations, such as application specific integrated circuits, programmable logic arrays and other hardware devices, can be constructed to implement one or more of the methods described herein. Applications that include the apparatus and systems of various implementations can broadly include a variety of electronic and computer systems. One or more implementations described herein implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 510 is connected to the network 540. The network 540 defines one or more networks including wired or wireless networks. The wireless network can be a cellular telephone network, an 802.11, 802.18, 802.20, or WiMAX network. Further, such networks include a public network, such as the Internet, a private network, such as an intranet, or combinations thereof, and utilize a variety of networking protocols now available or later developed including, but not limited to TCP/IP based networking protocols. The network 540 can include wide area networks (WAN), such as the Internet, local area networks (LAN), campus area networks, metropolitan area networks, a direct connection such as through a Universal Serial Bus (USB) port, or any other networks that allow for data communication. The network 540 is configured to couple one computing device to another computing device to enable communication of data between the devices. The network 540 generally is enabled to employ any form of machine-readable media for communicating information from one device to another. The network 540 includes communication methods by which information may travel between computing devices. The network 540 can be divided into sub-networks. The sub-networks allow access to all of the other components connected thereto or the sub-networks restrict access between the components. The network 540 can be regarded as a public or private network connection and can include, for example, a virtual private network or an encryption or other security mechanism employed over the public Internet, or the like.

In accordance with various implementations of the present disclosure, the methods described herein are implemented by software programs executable by a computer system. Further, in one example, non-limited implementation, implementations can include distributed processing, component/object distributed processing, and parallel processing. Alternatively, virtual computer system processing can be constructed to implement one or more of the methods or functionalities as described herein.

Although the present specification describes components and functions that are implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (e.g., computer) system executing instructions (computer-readable code) stored in storage. It will also be understood that the disclosure is not limited to any particular implementation or programming technique and that the disclosure is implementable using any appropriate techniques for implementing the functionality described herein. The disclosure is not limited to any particular programming language or operating system.

It should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention can be practiced without these specific details. In other instances, well-known methods, structures, and techniques have not been shown in detail in order not to obscure an understanding of this description.

Thus, while there has been described what are believed to be the preferred embodiments of the invention, those skilled in the art will recognize that other and further modifications can be made thereto without departing from the spirit of the invention, and it is intended to claim all such changes and modifications as falling within the scope of the invention. For example, any formulas given above are merely representative of procedures that can be used. Functionality can be added or deleted from the block diagrams and operations are interchangeable among functional blocks. Steps can be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

The above technical improvements, and additional technical improvements, have been described in detail throughout the present disclosure. Also, it should be apparent to a person of ordinary skill in the art that the technical improvements of the embodiments provided by the present disclosure are not limited to those explicitly discussed herein, and that additional technical improvements exist.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

The present disclosure also includes the following aspects:

Example 1. A computer-implemented method for anomaly alarm detection comprising: receiving, by a data storage module, time-series data from a plurality of sensors of an information technology infrastructure, each sensor corresponding to a respective metric; detecting a plurality of anomalies in the time-series data stored in the data storage module; generating a knowledge graph by: determining connections between the plurality of metrics based on the time-series data; and for each connection, determining a respective weight based on an impact score for metrics joined by the connection; and configuring a root cause determination engine to output one or more metrics as root cause candidates, the one or more metrics based on the knowledge graph, in response to input of a query associated with at least one metric.

Example 2. The computer-implemented method of Example 1, wherein the data storage module continuously receives the time-series data, such that the knowledge graph is continuously updated.

Example 3. The computer-implemented method of Example claim 1, wherein the data storage module periodically receives the time-series data, such that the knowledge graph is periodically updated.

Example 4. The computer-implemented method of any of Examples 1-3, wherein each of the root cause candidates includes a set of the time-series data determined to likely associated with at least one of the anomalies.

Example 5. The computer-implemented method of any of Examples 1-4, further including: determining that an alert threshold, based on a number of the plurality of anomalies, has been breached, wherein the alert threshold is based on the received time-series data.

Example 6. The computer-implemented method of Example 5, wherein the alert threshold is determined automatically based on the plurality of anomalies.

Example 7. The computer-implemented method of any of Examples 1-6, wherein the impact score is based on an anomaly score, a correlation score, and a support value.

Example 8. A system comprising: a plurality of sensors associated with an information technology infrastructure, each sensor corresponding to a respective metric; one or more processors operatively connected to the plurality of sensors; and at least one non-transitory computer readable medium storing instructions that are executable by the one or more processors to perform operations comprising: receiving, by a data storage module, time-series data from the plurality of sensors; detecting a plurality of anomalies in the time-series data stored in the data storage module; generating a knowledge graph by: determining connections between the plurality of metrics based on the time-series data; and for each connection, determining a respective weight based on an impact score for metrics joined by the connection; and configuring a root cause determination engine to output one or more metrics as root cause candidates in response to input of a query associated with at least one metric based on the knowledge graph.

Example 9. The system of Example 8, wherein the data storage module continuously receives the time-series data, such that the knowledge graph is continuously updated.

Example 10. The system of Example 8, wherein the data storage module periodically receives the time-series data, such that the knowledge graph is periodically updated.

Example 11. The system of any of Examples 8-10, wherein each of the root cause candidates is a set of the time-series data determined to likely cause at least one of the anomalies.

Example 12. The system of any of Examples 8-11, wherein the operations further include: determining that an alert threshold, based on a number of the plurality of anomalies, has been breached, wherein the alert threshold is based on the received time-series data.

Example 13. The system of Example 12, wherein the alert threshold is determined automatically based on plurality of anomalies.

Example 14. The system of any of Examples 8-13, wherein the impact score is based on an anomaly score, a correlation score, and a support value.

Example 15. A non-transitory computer readable medium, the non-transitory computer readable medium storing instructions which, when executed by one or more processors, cause the one or more processors to perform operations comprising: receiving, by a data storage module, time-series data from a plurality of sensors of an information technology infrastructure, each sensor corresponding to a respective metric; detecting a plurality of anomalies in the time-series data stored in the data storage module; generating a knowledge graph by: determining connections between the plurality of metrics based on the time-series data; and for each connection, determining a respective weight based on an impact score for metrics joined by the connection; and providing a root cause determination engine configured to output one or more metrics as root cause candidates in response to input of a query associated with at least one metric based on the knowledge graph.

Example 16. The non-transitory computer readable medium of Example 15, wherein the data storage module continuously receives the time-series data, such that the knowledge graph is continuously updated.

Example 17. The non-transitory computer readable medium of Example 15, wherein the data storage module periodically receives the time-series data, such that the knowledge graph is periodically updated.

Example 18. The non-transitory computer readable medium of any of Examples 15-17, wherein each of the root cause candidates is a set of the time-series data determined to likely cause at least one of the anomalies.

Example 19. The non-transitory computer readable medium of any of Examples 15-18, wherein the operations further include: determining that an alert threshold, based on a number of the plurality of anomalies, has been breached, wherein the alert threshold is based on the received time-series data.

Example 20. The non-transitory computer readable medium of any of Examples 15-19, wherein the impact score is based on an anomaly score, a correlation score, and a support value.

What is claimed is:

1. A computer-implemented method comprising:

receiving, by a data storage module, time-series data from a plurality of sensors of an information technology infrastructure, each sensor of the plurality of sensors corresponding to a respective metric of a plurality of metrics;

detecting a plurality of anomalies in the time-series data stored in the data storage module;

generating a knowledge graph by:

determining a plurality of connections between the plurality of metrics based on the time-series data, wherein each connection of the plurality of connections is determined between a respective pair of metrics of the plurality of metrics; and for each connection of the plurality of connections:

determining an impact score for the respective pair of metrics based on (i) one or more anomaly scores determined for the respective pair of metrics, (ii) a correlation score determined for the respective pair of metrics, and (iii) a support value determined for the respective pair of metrics using frequent item-set mining; and determining a respective weight for each connection between the respective pair of metrics based on the impact score; and configuring a root cause determination engine to determine and output one or more metrics of the plurality of metrics as one or more root cause candidates of the plurality of anomalies, the one or more metrics determined based on the knowledge graph, in response to receiving input of a query associated with at least one metric of the plurality of metrics.

2. The computer-implemented method of claim 1, wherein the data storage module continuously receives the time-series data, such that the knowledge graph is continuously updated.

3. The computer-implemented method of claim 1, wherein the data storage module periodically receives the time-series data, such that the knowledge graph is periodically updated.

4. The computer-implemented method of claim 1, wherein each of the one or more root cause candidates includes a set of the time-series data determined to likely be associated with at least one of the plurality of anomalies.

5. The computer-implemented method of claim 1, further including:

determining that an alert threshold, based on a number of the plurality of anomalies, has been breached, wherein the alert threshold is based on the received time-series data.

6. The computer-implemented method of claim 5, wherein the alert threshold is determined automatically based on the plurality of anomalies.

7. The computer-implemented method of claim 1, wherein the impact score for the respective pair of metrics represents a magnitude of impact of the respective pair of metrics as the plurality of anomalies are occurring.

8. The computer-implemented method of claim 1, wherein a plurality of primary anomaly scores are determined for each metric of the plurality of metrics, and the one or more anomaly scores determined for the respective pair of metrics include a first primary anomaly score for a first metric of the respective pair of metrics and a second primary anomaly score for a second metric of the respective pair of metrics.

9. The computer-implemented method of claim 1, wherein a plurality of secondary anomaly scores are determined for the plurality of metrics, and the method further comprises:

determining correlation values based on the plurality of secondary anomaly scores; and storing the correlation values in a data store, wherein the frequent item-set mining is applied to the stored correlation values.

10. A system comprising:

a plurality of sensors associated with an information technology infrastructure, each sensor of the plurality of sensors corresponding to a respective metric of a plurality of metrics;

one or more processors operatively connected to the plurality of sensors; and one or more non-transitory computer readable media storing processor-executable instructions that, when executed by the one or more processors, cause the one or more processors to perform operations comprising:

receiving, by a data storage module, time-series data from the plurality of sensors;

detecting a plurality of anomalies in the time-series data stored in the data storage module;

generating a knowledge graph by:

determining a plurality of connections between the plurality of metrics based on the time-series data, wherein each connection of the plurality of connections is determined between a respective pair of metrics of the plurality of metrics; and for each connection of the plurality of connections:

determining an impact score for the respective pair of metrics based on (i) one or more anomaly scores determined for the respective pair of metrics, (ii) a correlation score determined for the respective pair of metrics, and (iii) a support value determined for the respective pair of metrics using frequent item-set mining; and determining a respective weight for each connection between the respective pair of metrics based on the impact score; and configuring a root cause determination engine to determine and output one or more metrics of the plurality of metrics as one or more root cause candidates of the plurality of anomalies, the one or more metrics determined based on the knowledge graph, in response to receiving input of a query associated with at least one metric of the plurality of metrics.

11. The system of claim 10, wherein the data storage module continuously receives the time-series data, such that the knowledge graph is continuously updated.

12. The system of claim 10, wherein the data storage module periodically receives the time-series data, such that the knowledge graph is periodically updated.

13. The system of claim 10, wherein each of the one or more root cause candidates is a set of the time-series data determined to likely cause at least one of the plurality of anomalies.

14. The system of claim 10, wherein the operations further include:

determining that an alert threshold, based on a number of the plurality of anomalies, has been breached, wherein the alert threshold is based on the received time-series data.

15. The system of claim 14, wherein the alert threshold is determined automatically based on the plurality of anomalies.

16. One or more non-transitory computer readable media storing instructions that, when executed by one or more processors, cause the one or more processors to perform operations comprising:

receiving, by a data storage module, time-series data from a plurality of sensors of an information technology infrastructure, each sensor of the plurality of sensors corresponding to a respective metric of a plurality of metrics;

detecting a plurality of anomalies in the time-series data stored in the data storage module;

generating a knowledge graph by:

determining a plurality of connections between the plurality of metrics based on the time-series data, wherein each connection of the plurality of connections is determined between a respective pair of metrics of the plurality of metrics; and for each connection of the plurality of connections:

determining an impact score for the respective pair of metrics based on (i) one or more anomaly scores determined for the respective pair of metrics, (ii) a correlation score determined for the respective pair of metrics, and (iii) a support value determined for the respective pair of metrics using frequent item-set mining; and determining a respective weight for each connection between the respective pair of metrics based on the impact score; and providing a root cause determination engine configured to determine and output one or more metrics of the plurality of metrics as one or more root cause candidates of the plurality of anomalies, the one or more metrics determined based on the knowledge graph, in response to receiving input of a query associated with at least one metric of the plurality of metrics.

17. The one or more non-transitory computer readable media of claim 16, wherein the data storage module continuously receives the time-series data, such that the knowledge graph is continuously updated.

18. The one or more non-transitory computer readable media of claim 16, wherein the data storage module periodically receives the time-series data, such that the knowledge graph is periodically updated.

19. The one or more non-transitory computer readable media of claim 16, wherein each of the one or more root cause candidates is a set of the time-series data determined to likely cause at least one of the plurality of anomalies.

20. The one or more non-transitory computer readable media of claim 16, wherein the operations further include:

determining that an alert threshold, based on a number of the plurality of anomalies, has been breached, wherein the alert threshold is based on the received time-series data.

* * * * *